Sept. 2, 1924. Re. 15,908

L. G. COPEMAN

REFRIGERATOR LATCH

Original Filed Dec. 26, 1922

INVENTOR.
Lloyd G. Copeman

BY Stuart C. Barnes
ATTORNEY.

Reissued Sept. 2, 1924.

Re. 15,908

UNITED STATES PATENT OFFICE.

LLOYD G. COPEMAN, OF FLINT, MICHIGAN.

REFRIGERATOR LATCH.

Original No. 1,489,981, dated April 8, 1924, Serial No. 608,833, filed December 26, 1922. Application for reissue filed June 23, 1924. Serial No. 721,946.

*To all whom it may concern:*

Be it known that I, LLOYD G. COPEMAN, a citizen of the United States, and a resident of Flint, Genesee County, Michigan, have invented certain new and useful Improvements in Refrigerator Latches, of which the following is a specification.

This invention relates to refrigerator latches and has for its object a reversible refrigerator latch—one that may be used either on a right or left hand door.

It is the object of the present invention to afford a refrigerator latch which works on the principle of a so-called cam latch and yet which has some of the features of a spring latch so that the door can be thrown closed. The latch will latch automatically and hold the door closed. By pressing on the latch lever the door can be closed even tighter to make an air tight seal.

The casing and the latch lever are so designed that when the latch lever is in the final position of closing the casing is tightly sealed to avoid admission of dirt to the inside of the casing which might otherwise make the latch somewhat unsanitary.

*a* designates a plate or supporting member secured to the door by screws *b* and in the form of a casting, having a yoke portion *c* which is adapted to support a pivot pin *d*. On this pivot pin is rotatably supported the lever *e*. This lever in turn supports rotatably the roll *f* which forms the striking surface of the lever. An expansion spring *h* is contained in a hollowed out casing formed at the rear of the yoke and serves to abut against the apron *i* which is an integral part of the lever *e*. The arm that bears the roll *f*, together with the handle portion *j* of the lever, forms a bell crank lever. The handle forms the power arm of this lever while the load arm is a double one, one portion of which carries the roll that engages the striker while the other portion forms the apron and a spring abutment.

The striker *g* has a face that has a slightly reversed curve. The purpose of this is, that when the door is slammed shut the initial impact of the roll against the striker is not great due to the fact that the striking surface has a very small angle with respect to the line of the travel of the roll. However, after the roll has traveled a slight distance along the striker, this angle increases due to the turn in the curve. The roll is then forced back against the resistance of the spring *h* until it passes over the point of the striker and drops behind the striker.

Figure 1:
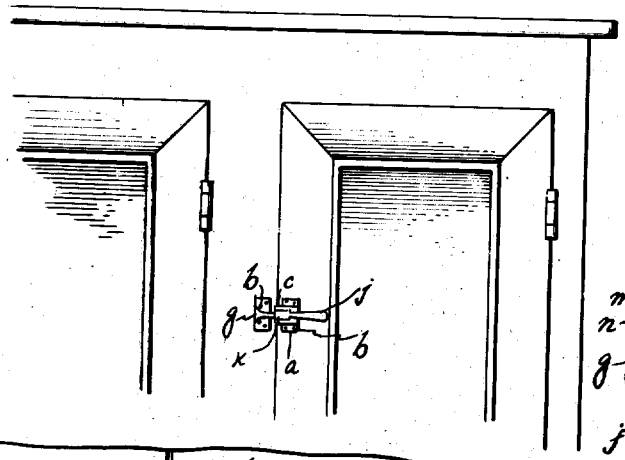
Fig. 1 is a fragmentary front elevation of a refrigerator showing the latch in place.
Figure 4:
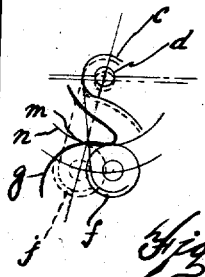
Fig. 4 is a diagrammatic view of the cam action.
Figure 2:
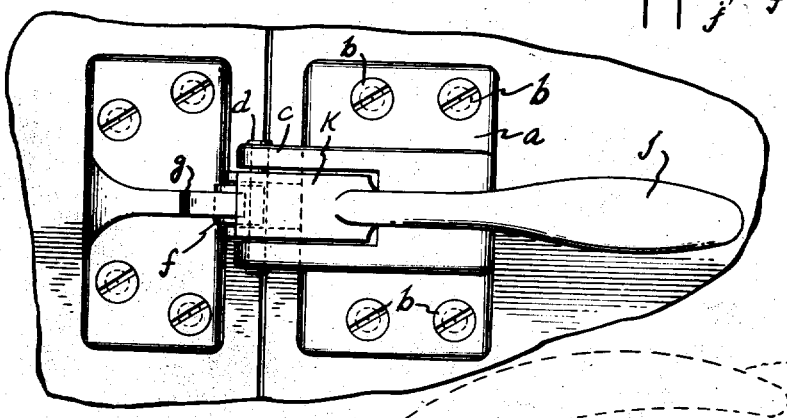
Fig. 2 is a front elevation of the latch.
Figure 3:
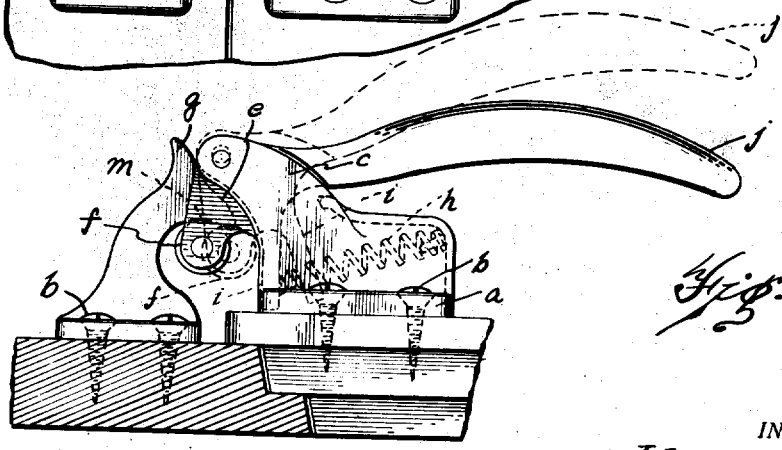
Fig. 3 is a view of the underside of the latch shown in Fig. 2 showing in dotted lines the position assumed when the door is merely thrown shut.

When the door is slammed shut the lever will take the position shown by the dotted lines in Fig. 3. That is, the roll will just drop behind the point of the striker. This will hold the door closed but not as tightly as it may be. Now referring to Fig. 4, the action of the cam latch feature is diagrammed in detail. When the door is slammed shut the lever will take the position as shown in full lines, the roller positioned as shown. The lever *j* is then pushed further down causing the roller to ride on the under cam face *m* of the striker *g*. It will be noted that this cam face *m* follows the path as shown by the circle *n* for a short distance and then curves downwardly away from said path. The roller takes the position as shown in Fig. 4, by the dotted lines, causing the door to be tightly closed making it substantially an air tight seal. The spring *h* retains the roller in this position and consequently retains the door in the tightly closed position.

It will be noted that the same movement that disengages the roll from the striker may also serve to pull the latch open. Furthermore, when the lever is pushed down to its innermost position the apron *i* closes the front of the latch casing while the body *k* of the lever closes the face of the latch casing, thereby substantially excluding dust from entering the casing and the lock becoming unsanitary.

It will be seen that the latch in its action is an automatic spring latch in one sense and also a cam latch. In its initial automatic closing feature it is a spring lever latch. In the final closing operation it is a cam latch.

One of the important features of the preferred form of this latch is that the same locks against any opening of the door from a thrust originating on the inside of the door. It is therefore, an admirable lock for an ice chamber. So many of the locks which are on the market and which are capable of latching action are not proof against unlocking when the ice falls against the ice chamber door.

It will be noted that when the striking roll *f* is pushed into its innermost position shown in Fig. 3, the center of this roll passes over a line perpendicular to the face of the refrigerator and passing through the fulcrum of the roll. Hence, a thrust originating on the inside of the door instead of tending to disengage the roll from behind the striker *g* will drive the roll all the further into the socket behind the striker *g* by reason of the center of the roll lying over this perpendicular line.

What I claim is:

1. In a refrigerator latch, the combination of a latch support, a striker provided with a striker socket behind the striking surface, and a swinging latch member which when forced to its locking position passes over a line perpendicular to the face of the refrigerator and passing through the fulcrum point of the latch.

2. In a refrigerator latch, the combination of a latch support, a striker provided with a striker socket behind the striking surface, and a latch lever pivotally supported on the support so that the striking surface of the latch lever when forced home into the striker socket passes over a line perpendicular to the front of the refrigerator passing through the fulcrum of the lever.

3. In a refrigerator latch, the combination of a latch support, a swinging latch lever member pivotally supported on said support and arranged to swing in the plane in which the door opens, and a striker provided with a striker socket behind the striking surface of the same, the fulcrum of the lever being arranged with respect to the striker so that when the striking surface of the lever is forced home in the striker socket, the same passes over a line perpendicular to the front of the refrigerator passing through the fulcrum of the lever.

4. In a refrigerator latch, the combination of a latch support, a bell-crank like latch lever pivotally supported on the latch support, and a striker provided with a striker socket behind the striking surface of same, the fulcrum of the bell crank latch lever being arranged with respect to the striker so that when the striking surface of the lever is forced home in the striker socket the same passes over a line perpendicular to the front of the refrigerator passing through the fulcrum of the lever.

5. In a refrigerator latch, the combination of a latch support, a latch lever of the bell-crank type pivotally supported on the latch support, a striker provided with a striker socket behind the striking surface of same, and a spring tending to swing the latch lever into the striker socket, the fulcrum of the latch lever being so arranged with respect to the striker that when the striking surface of the latch lever is forced home into the striker socket, the same passes over a line perpendicular to the front of the refrigerator passing through the fulcrum of the lever.

6. In a refrigerator latch, the combination of a latch support, a bell-crank latch lever pivotally supported thereon, a striker provided with a striker socket behind the striking surface of same, and a spring tending to force the striking surface of the lever into the striker socket, the said lever being arranged to swing in a plane in which the door swings and arranged so that when the striking surface of the lever is forced home into the striking socket, the same swings over a line perpendicular to the front of the refrigerator passing through the fulcrum of the lever.

7. In a refrigerator latch, the combination of a latch housing, a latch lever of the bell-crank type pivotally supported on the latch housing and having a roll connected with its end, and a striker having a sloping surface and a striker socket behind said sloping surface, the roll adapted to first engage the surface of the striker and then engage behind the same in the striker socket, the latch lever swinging in the same plane that the door swings.

8. In a refrigerator latch, the combination of a latch housing, a bell-crank latch member pivotally supported in the latch housing and tending to be forced outwardly, a spring for forcing the same outwardly, and a striker having a sloping striking face and a striker socket behind the same, the said latch lever arranged to swing in the same plane that the door swings and arranged to have a striking surface engage the face of the striker and then drop behind the same into the striker socket.

9. In a refrigerator latch, the combination of a latch housing, a bell-crank lever pivotally supported thereon to swing in the same plane that the door opens and provided at one end of the bell-crank arm with a roller, a spring thrusting on one arm of the bell crank lever for forcing the latch lever yieldingly outward, and a striker provided with a sloping face behind which is a striker socket, said roll arranged to strike the sloping surface of the striker and drop into the socket behind.

10. In a refrigerator latch, the combination of a latch housing, a bell crank lever pivotally supported thereon to swing in the same plane that the door swings and provided with an additional arm, a spring in said housing engaging against said additional arm and tending to thrust said lever outwardly from said housing, a roll on the end of one of the bell crank arms of the lever, and a striker having a sloping front face behind which is the striker socket, the said roll arranged to engage the face of the striker and drop into the socket behind.

11. A refrigerator latch, having in combination a latch lever pivotally supported to swing toward and away from the door in the plane in which the door swings, a striker engaging member controlled by said lever when moving in either direction, a striker provided with two substantially vertical surfaces when mounted adjacent a door swinging in a horizontal plane said two surfaces inclining toward each other at an angle, a spring tending to thrust the striker engaging member outwardly and a handle portion of the lever toward the door, the striker-engaging surface and the parts being arranged so that the striker-engaging member may engage first the outer surface of the striker, then throw over the point of the striker and engage part way up the inner surface of the striker which is inclined to the thrust of the striker-engaging member, whereby the inner surface of the striker may have a camming action with respect to the striker-engaging member so that the door may be tightly forced shut by pressing the handle toward the door, and whereby the fixture is both a right and left hand fixture.

12. A latch for refrigerators, having in combination a reversible fixture which may be applied to either a right or left hand door, a bell-crank lever pivotally supported by the fixture, an anti-friction roll movable in and out of the fixture and controlled by movement in either direction of the lever, a spring whose thrust forces the roller outwardly and the handle of the lever toward the door, the said lever being arranged to swing toward and away from the door in the plane of the swing of the door, and a striker having an inner surface and an outer surface inclined toward each other and invertible to act as a fixture for either a right or left hand door, the afore-mentioned elements being arranged and positioned so that the spring may easily yield to permit the roll to throw over the point of the striker in closing the door, the inner surface of the striker being inclined to the thrust of the roller, whereby a further pushing of the lever handle toward the door causes the roll to ride up the inclined surface on the inside of the striker to force the door tightly closed.

13. A refrigerator latch, having in combination a bell-crank latch lever pivotally supported to swing toward and away from the door, a striker-engaging member in the form of a roll controlled by said lever when moving in either direction, a striker provided with two surfaces inclining toward each other at an angle, and a spring tending to thrust the striker-engaging member outwardly and the handle portion of the lever toward the door, the striker-engaging surface and the parts being arranged so that the roll may engage first the outer surface of the striker, then automatically throw over the point of the striker and engage part way up the inner surface of the striker which is inclined to the thrust of the roll, whereby the inner surface may have a camming action with respect to the striker engaging member so that the door may be tightly forced shut by pressing the handle toward the door.

In testimony whereof, I have affixed my signature.

LLOYD G. COPEMAN.